(12) United States Patent
Wittkopp et al.

(10) Patent No.: US 8,529,395 B2
(45) Date of Patent: Sep. 10, 2013

(54) MULTI-SPEED TRANSMISSION

(75) Inventors: Scott H. Wittkopp, Ypsilanti, MI (US);
Andrew W. Phillips, Rochester, MI (US); James M. Hart, Belleville, MI (US); Edward W. Mellet, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/277,967

(22) Filed: Oct. 20, 2011

(65) Prior Publication Data

US 2012/0178581 A1    Jul. 12, 2012

Related U.S. Application Data

(60) Provisional application No. 61/430,504, filed on Jan. 6, 2011.

(51) Int. Cl.
*F16H 3/44*    (2006.01)
(52) U.S. Cl.
USPC ........................................ 475/280

(58) Field of Classification Search
USPC .................. 475/271, 275–291, 296, 330
See application file for complete search history.

(56) References Cited

U.S. PATENT DOCUMENTS

| | | | |
|---|---|---|---|
| 6,176,803 B1 | 1/2001 | Meyer et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 2007/0072732 A1* | 3/2007 | Klemen | 475/280 |
| 2008/0039267 A1* | 2/2008 | Shim | 475/280 |
| 2008/0108473 A1* | 5/2008 | Shim | 475/276 |
| 2009/0017971 A1* | 1/2009 | Phillips et al. | 475/276 |
| 2011/0111914 A1* | 5/2011 | Phillips et al. | 475/271 |

* cited by examiner

*Primary Examiner* — Justin Holmes
*Assistant Examiner* — Huan Le

(57) ABSTRACT

A transmission is provided having an input member, an output member, four planetary gear sets, a plurality of coupling members and six torque transmitting devices. Each of the planetary gear sets includes first, second and third members. The torque transmitting devices may include clutches and brakes.

20 Claims, 6 Drawing Sheets

| GEAR STATE | GEAR RATIO | RATIO STEP | CLUTCHING ELEMENTS ||||||
|---|---|---|---|---|---|---|---|---|
| | | | 30 | 32 | 34 | 36 | 26 | 28 |
| REV | -5.550 | | X | | | X | | |
| N | | -0.96 | | | | O | | |
| 1ST | 5.767 | | | X | | X | | |
| 2ND | 3.461 | 1.67 | | | | X | | X |
| 3RD | 2.437 | 1.42 | | X | | | | X |
| 4TH | 1.687 | 1.44 | | | X | | | X |
| 5TH | 1.278 | 1.32 | X | | | | | X |
| 6TH | 1.000 | 1.28 | | | | | X | X |
| 7TH | 0.828 | 1.21 | X | | | | X | |
| 8TH | 0.721 | 1.15 | | | X | | X | |
| 9TH | 0.641 | 1.13 | | X | | | X | |

X = ON - ENGAGED CARRYING TORQUE
O = ON - ENGAGED NOT CARRYING TORQUE

| GEAR STATE | GEAR RATIO | RATIO STEP | CLUTCHING ELEMENTS | | | | | |
|---|---|---|---|---|---|---|---|---|
| | | | 30 | 32 | 34 | 36 | 26 | 28 |
| REV | -4.851 | | X | | | X | | |
| N | | -0.91 | | | | O | | |
| 1ST | 5.345 | | | X | | X | | |
| 2ND | 3.148 | 1.70 | | | | X | | X |
| 3RD | 2.305 | 1.37 | | X | | | | X |
| 4TH | 1.665 | 1.38 | | | X | | | X |
| 5TH | 1.275 | 1.31 | X | | | | | X |
| 6TH | 1.000 | 1.28 | | | | | X | X |
| 7TH | 0.805 | 1.24 | X | | | X | | |
| 8TH | 0.690 | 1.17 | | | X | | X | |
| 9TH | 0.611 | 1.13 | | X | | | X | |

X = ON - ENGAGED CARRYING TORQUE
O = ON - ENGAGED NOT CARRYING TORQUE

| GEAR STATE | GEAR RATIO | RATIO STEP | CLUTCHING ELEMENTS | | | | | |
|---|---|---|---|---|---|---|---|---|
| | | | 30 | 36 | 32 | 34 | 28 | 26 |
| REV | -4.888 | | X | | | X | | |
| N | | -1.08 | | | | O | | |
| 1ST | 4.531 | | | X | | X | | |
| 2ND | 2.700 | 1.68 | | | | X | | X |
| 3RD | 2.052 | 1.32 | | X | | | | X |
| 4TH | 1.515 | 1.35 | | | X | | | X |
| 5TH | 1.220 | 1.24 | X | | | | | X |
| 6TH | 1.000 | 1.22 | | | | | X | X |
| 7TH | 0.813 | 1.23 | X | | | | X | |
| 8TH | 0.697 | 1.17 | | | X | | X | |
| 9TH | 0.604 | 1.15 | | X | | | X | |

X = ON - ENGAGED CARRYING TORQUE
O = ON - ENGAGED NOT CARRYING TORQUE

| GEAR STATE | GEAR RATIO | RATIO STEP | CLUTCHING ELEMENTS ||||||
|---|---|---|---|---|---|---|---|---|
| | | | 30 | 32 | 34 | 36 | 26 | 28 |
| REV | -4.857 | | X | | | X | | |
| N | | -0.90 | | | | O | | |
| 1ST | 5.405 | | | X | | X | | |
| 2ND | 2.867 | 1.88 | | | | X | | X |
| 3RD | 2.075 | 1.38 | | X | | | | X |
| 4TH | 1.581 | 1.31 | | | X | | | X |
| 5TH | 1.250 | 1.26 | X | | | | | X |
| 6TH | 1.000 | 1.25 | | | | | X | X |
| 7TH | 0.802 | 1.25 | X | | | | X | |
| 8TH | 0.689 | 1.17 | | | X | | X | |
| 9TH | 0.611 | 1.13 | | X | | | X | |

X = ON - ENGAGED CARRYING TORQUE
O = ON - ENGAGED NOT CARRYING TORQUE

| GEAR STATE | GEAR RATIO | RATIO STEP | CLUTCHING ELEMENTS ||||||
|---|---|---|---|---|---|---|---|---|
| | | | 34 | 30 | 32 | 36 | 26 | 28 |
| REV | 4.803 | | X | | | X | | |
| N | | -0.93 | | | | O | | |
| 1ST | 5.186 | | | X | | X | | |
| 2ND | 3.189 | 1.63 | | | | X | | X |
| 3RD | 2.348 | 1.36 | | X | | | | X |
| 4TH | 1.652 | 1.42 | | | X | | | X |
| 5TH | 1.252 | 1.32 | X | | | | | X |
| 6TH | 1.000 | 1.25 | | | | | X | X |
| 7TH | 0.822 | 1.22 | X | | | | X | |
| 8TH | 0.702 | 1.17 | | | X | | X | |
| 9TH | 0.618 | 1.14 | | X | | | X | |

X = ON - ENGAGED CARRYING TORQUE
O = ON - ENGAGED NOT CARRYING TORQUE

US 8,529,395 B2

MULTI-SPEED TRANSMISSION

CROSS-REFERENCE

This application claims the benefit of U.S. Provisional Application No. 61/430,504, filed Jan. 6, 2011. The entire contents of the above application are incorporated herein by reference.

FIELD

The invention relates generally to a multiple speed transmission having a plurality of planetary gear sets and a plurality of torque transmitting devices and more particularly to a multiple speed transmission having four planetary gear sets and a plurality of torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In one example, the transmission includes an input member, an output member, a first and a second planetary gear set each having a first, a second, and a third member, wherein each of the first, second, and third members is included in one of a first rotary member, a second rotary member, a third rotary member, and a fourth rotary member, and wherein two of the members of the first planetary gear set are directly separately connected with two of the members of the second planetary gear set to form the first and the second rotary members and wherein the fourth rotary member is directly connected to the input member.

The transmission also includes a third and a fourth planetary gear set each having a first, a second, and a third member, wherein each of the first, second, and third members is included in one of a fifth rotary member, a sixth rotary member, a seventh rotary member, and an eighth rotary member, and wherein two of the members of the third planetary gear set are directly separately connected with two of the members of the fourth planetary gear set to form the fifth and sixth rotary members and wherein the sixth rotary member is directly connected to the output member. An interconnecting member continuously connected to the first rotary member and the seventh rotary member.

Six torque transmitting devices are each selectively engageable to connect at least one of the first, second, third, fourth, fifth, seventh, and eighth rotary members with at least one other of a stationary member and the first, second, third, fourth, fifth, seventh, and eighth rotary members. The torque transmitting devices are selectively engageable in combinations of at least two to establish multiple forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
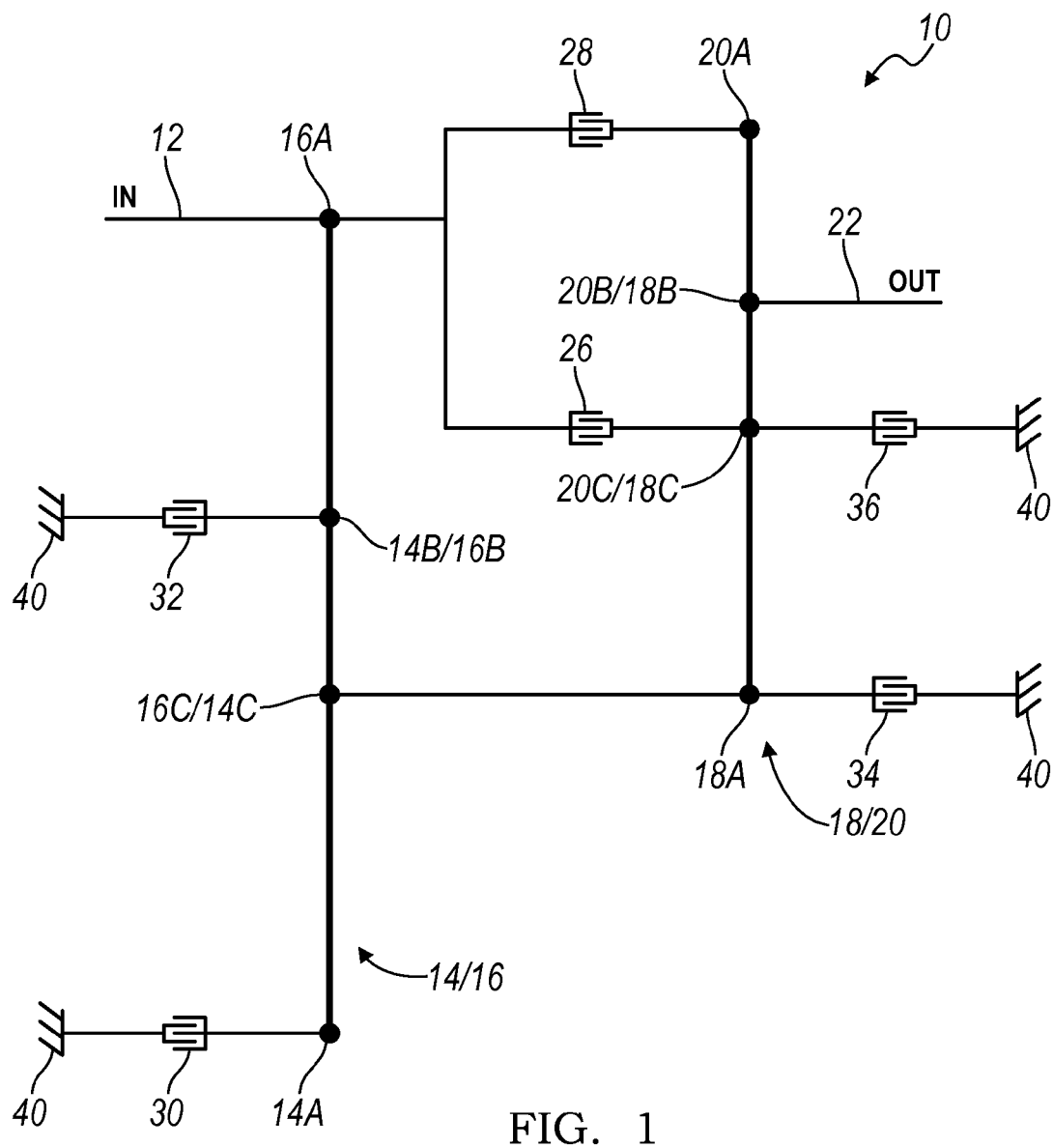
FIG. 1 is a lever diagram of an embodiment of a multiple speed transmission according to the present invention.

Referring now to FIG. 1, an embodiment of a multiple speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input member 12 is coupled to the first node 16A of the second planetary gear set 16. The output member 22 is coupled to the second node 18B of the third planetary gear set 18 and the second node 20B of the fourth planetary gear set 20. The second node 14B of the first planetary gear set 14 is coupled to the second node 16B of the second planetary gear set 16. The third node 14C of the first planetary gear set 14 is coupled to the third node 16C of the second planetary gear set 16 and the first node 18A of the third planetary gear set 18. The second node 18B of the third planetary gear set 18 is coupled to the second node 20B of the fourth planetary gear set 20. The third node 18C of the third planetary gear set 18 is coupled to the third node 20C of the fourth planetary gear set 20.

A first clutch 26 selectively connects the first node 16A of the second planetary gear set 16 and the input member 12 with the third node 18C of the third planetary gear set 18 and the third node 20C of the fourth planetary gear set 20. A second clutch 28 selectively connects the first node 16A of the second planetary gear set 16 and the input member 12 with the first node 20A of the fourth planetary gear set 20. A first brake 30 selectively connects the first node 14A of the first planetary gear set 14 to a stationary member or a transmission housing 40. A second brake 32 selectively connects the second node 14B of the first planetary gear set 14 and the second node 16B of the second planetary gear set 16 to a stationary member or transmission housing 40. A third brake 34 selectively connects the third node 14C of the first planetary gear set, the third node 16C of the second planetary gear set 16, and the first node 18A of the third planetary gear set 18 to the stationary member or transmission housing 40. A fourth brake 36 selectively connects the third node 18C of the third planetary gear set 18 and the third node 20C of the fourth planetary gear set 20 to the stationary member or transmission housing 40.

Figures 2, 3:
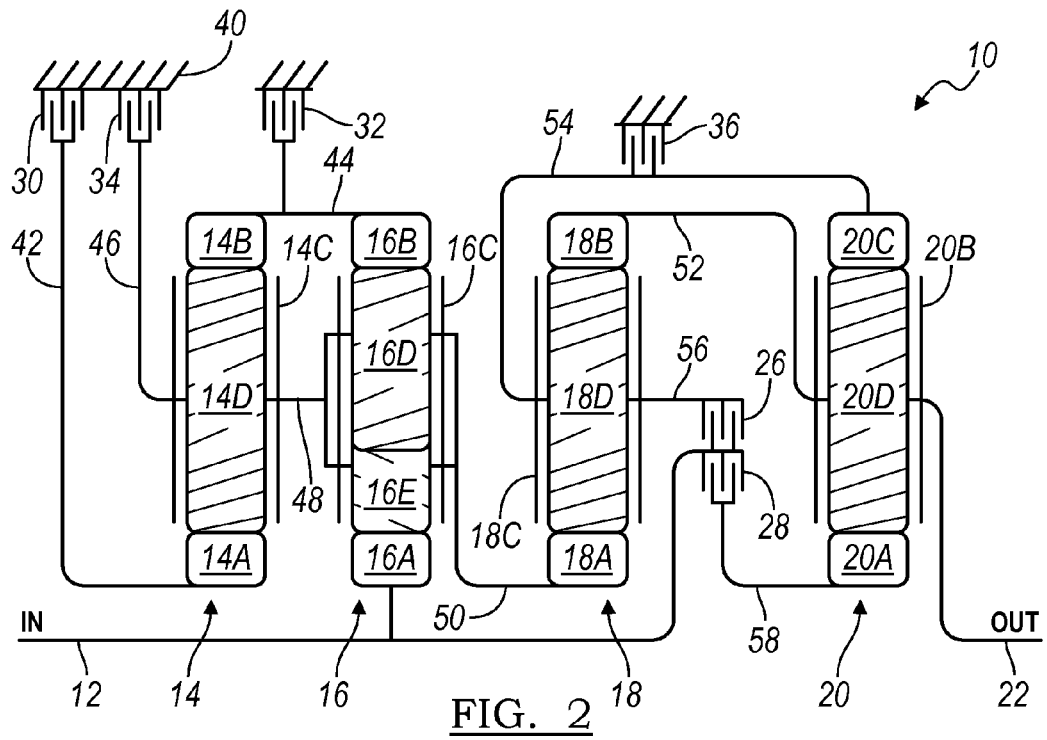
FIG. 2 is a diagrammatic view of an embodiment of a multiple speed transmission according to the present invention.
FIG. 3 is a truth table presenting the state of engagement of the various torque transmitting elements in each of the available forward and reverse speeds or gear ratios of the transmission illustrated in FIGS. 1 and 2.

Referring now to FIG. 2, a stick diagram presents a schematic layout of the embodiment of the multiple speed transmission 10 according to the present invention. In FIG. 2, the numbering from the lever diagram of FIG. 1 is carried over.

The clutches, brakes, and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a planet gear carrier member 14C and a ring gear member 14B. The sun gear member 14A is connected for common rotation with a first shaft or interconnecting member 42. The ring gear member 14B is connected for common rotation with a second shaft or interconnecting member 44. The planet gear carrier member 14C rotatably supports a set of planet gears 14D (only one of which is shown) and is connected for common rotation with a third shaft or interconnecting member 46 and a fourth shaft or interconnecting member 48. The planet gears 14D are each configured to intermesh with both the sun gear member 14A and the ring gear member 14B.

The second planetary gear set 16 includes a sun gear member 16A, a planet carrier member 16C that rotatably supports a set of planet gears 16D and 16E, and a ring gear member 16B. The sun gear member 16A is connected for common rotation with the input member 12. The ring gear member 16B is connected for common rotation with the second shaft or interconnecting member 44. The planet carrier member 16C is connected for common rotation with the fourth shaft or interconnecting member 48 and a fifth shaft or interconnecting member 50. The planet gears 16D are each configured to intermesh with both the ring gear member 16B and the planet gears 16E. The planet gears 16E are each configured to intermesh with both the planet gears 16D and the sun gear 16A.

The third planetary gear set 18 includes a sun gear member 18A, a ring gear member 18B and a planet carrier member 18C that rotatably supports a set of planet gears 18D. The sun gear member 18A is connected for common rotation with the fifth interconnecting member 50. The ring gear member 18B is connected for common rotation with a sixth shaft or interconnecting member 52. The planet carrier member 18C is connected for common rotation with a seventh shaft or interconnecting member 54 and with an eighth shaft or interconnecting member 56. The planet gears 18D are each configured to intermesh with both the sun gear member 18A and the ring gear member 18B.

The fourth planetary gear set 20 includes a sun gear member 20A, a ring gear member 20C and a planet carrier member 20B that rotatably supports a set of planet gears 20D. The sun gear member 20A is connected for common rotation with a ninth shaft or interconnecting member 58. The ring gear member 20C is connected for common rotation with the seventh interconnecting member 54. The planet carrier member 20B is connected for common rotation with the sixth interconnecting member 52 and with the output member 22. The planet gears 20D are each configured to intermesh with both the sun gear member 20A and the ring gear member 20C.

The input shaft or member 12 is preferably continuously connected to an engine (not shown) or to a turbine of a torque converter (not shown). The output shaft or member 22 is preferably continuously connected with the final drive unit or transfer case (not shown).

The torque-transmitting mechanisms or clutches 26, 28 and brakes 30, 32, 34, 36 allow for selective interconnection of the shafts or interconnecting members, members of the planetary gear sets and the housing. For example, the first clutch 26 is selectively engageable to connect the eighth interconnecting member 56 with the input member 12. The second clutch 28 is selectively engageable to connect the ninth interconnecting member 58 with the input member 12. The first brake 30 is selectively engageable to connect the first interconnecting member 42 to the stationary member or transmission housing 40 in order to restrict the sun gear member 14A of the first planetary gear set 14 from rotating relative to the stationary member or transmission housing 40. The second brake 32 is selectively engageable to connect the second interconnecting member 44 to the stationary member or transmission housing 40 in order to restrict the ring gear member 14B of the first planetary gear set 14 and the ring gear member 16B of the second planetary gear set 16 from rotating relative to the stationary member or transmission housing 40. The third brake 34 is selectively engageable to connect the third interconnecting member 46 to the stationary member or transmission housing 40 in order to restrict the planet carrier member 14C of the first planetary gear set 14, the planet carrier member 16C of the second planetary gear set 16, and the sun gear 18A of the third planetary gear set 18 from rotating relative to the stationary member or transmission housing 40. The fourth brake 36 is selectively engageable to connect the seventh interconnecting member 54 to the stationary member or transmission housing 40 in order to restrict the planet carrier member 18C of the third planetary gear set 18 and the ring gear member 20C of the fourth planetary gear set 20 from rotating relative to the stationary element or transmission housing 40.

Referring now to FIGS. 2 and 3, the operation of the embodiment of the multiple speed transmission 10 will be described. It will be appreciated that the transmission 10 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34, and fourth brake 36), as will be explained below. FIG. 3 is a truth table presenting the various combinations of torque transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first brake 30 and the fourth brake 36 are engaged or activated. The first brake 30 connects the first interconnecting member 42 to the stationary member or transmission housing 40 in order to restrict the sun gear member 14A of the first planetary gear set 14 from rotating relative to the stationary member or transmission housing 40. The fourth brake 36 connects the seventh interconnecting member 54 to the stationary member or transmission housing 40 in order to restrict the planet carrier member 18C of the third planetary gear set 18 and the ring gear member 20C of the fourth planetary gear set 20 from rotating relative to the stationary element or transmission housing 40. Likewise, the nine forward ratios are achieved through different combinations of clutch and brake engagement, as shown in FIG. 3.

Figures 4, 5:
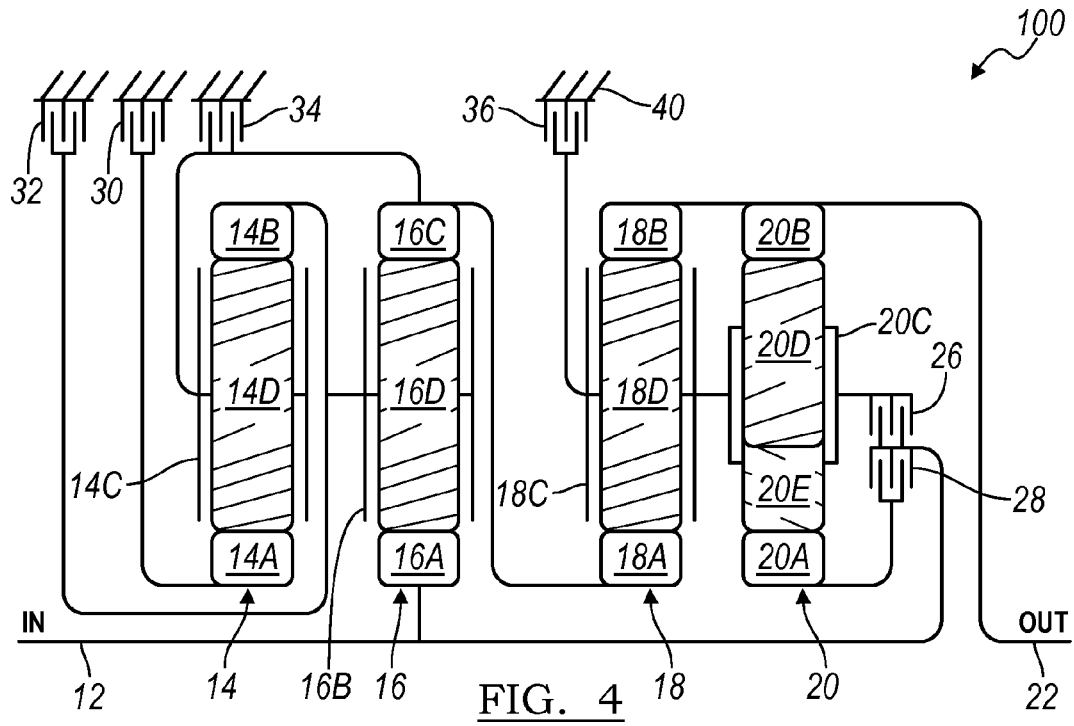
FIG. 4 is a diagrammatic view of an embodiment of a multiple speed transmission according to the present invention.
FIG. 5 is a truth table presenting the state of engagement of the various torque transmitting elements in each of the available forward and reverse speeds or gear ratios of the transmission illustrated in FIGS. 1 and 4.

Turning to FIG. 4, a stick diagram presents a schematic layout of another embodiment of a multiple speed transmission 100 based on the transmission 10 according to the present invention. In FIG. 4, the components of planetary gear sets such as sun gears, ring gears, planet gears and planet gear carriers, clutches, brakes, and couplings are correspondingly presented in the transmission 100. Referring now to FIGS. 4 and 5, the operation of the embodiment of the multiple speed transmission 100 will be described. It will be appreciated that the transmission 100 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34, and fourth brake 36). FIG. 5 is a truth table presenting the various combinations of torque transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 5. Of course, other gear ratios are achievable depending on the gear diameter, gear teeth count and gear configuration selected.

Figures 6, 7:
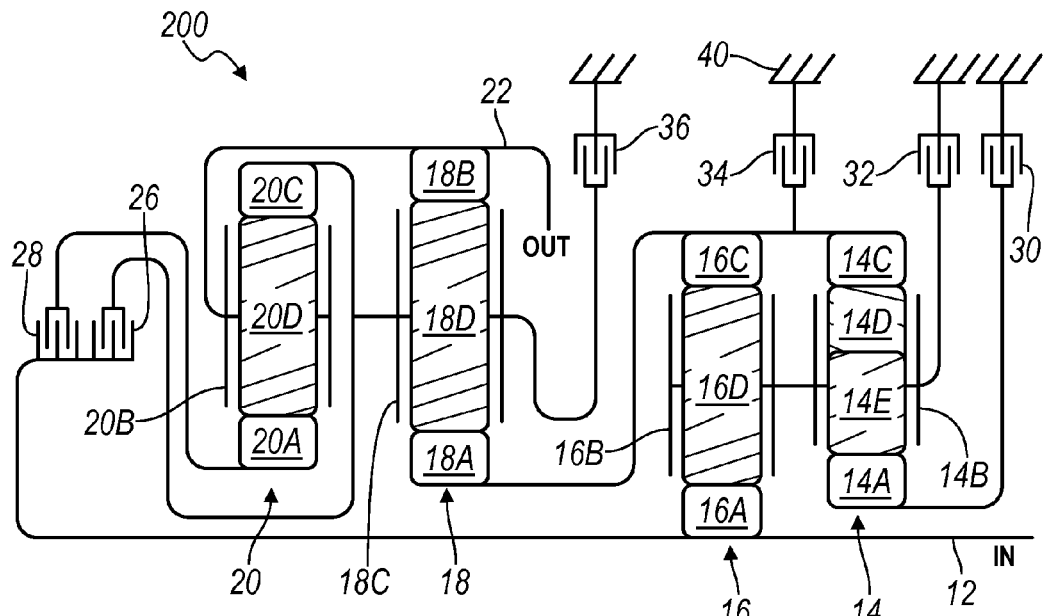
FIG. 6 is a diagrammatic view of an embodiment of a multiple speed transmission according to the present invention.
FIG. 7 is a truth table presenting the state of engagement of the various torque transmitting elements in each of the available forward and reverse speeds or gear ratios of the transmission illustrated in FIGS. 1 and 6.

Turning to FIG. 6, a stick diagram presents a schematic layout of another embodiment of a multiple speed transmission 200 based on the transmission 10 according to the present invention. In FIG. 6, the components of planetary gear sets such as sun gears, ring gears, planet gears and planet gear carriers, clutches, brakes, and couplings are correspondingly presented in the transmission 200. Referring now to FIGS. 6 and 7, the operation of the embodiment of the multiple speed transmission 200 will be described. It will be appreciated that the transmission 200 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34, and fourth brake 36). FIG. 7 is a truth table presenting the various combinations of torque transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 200. An example of the gear ratios that may be obtained using the embodiments of the present invention are also shown in FIG. 7. Of course, other gear ratios are achievable depending on the gear diameter, gear teeth count and gear configuration selected.

Figures 8, 9:
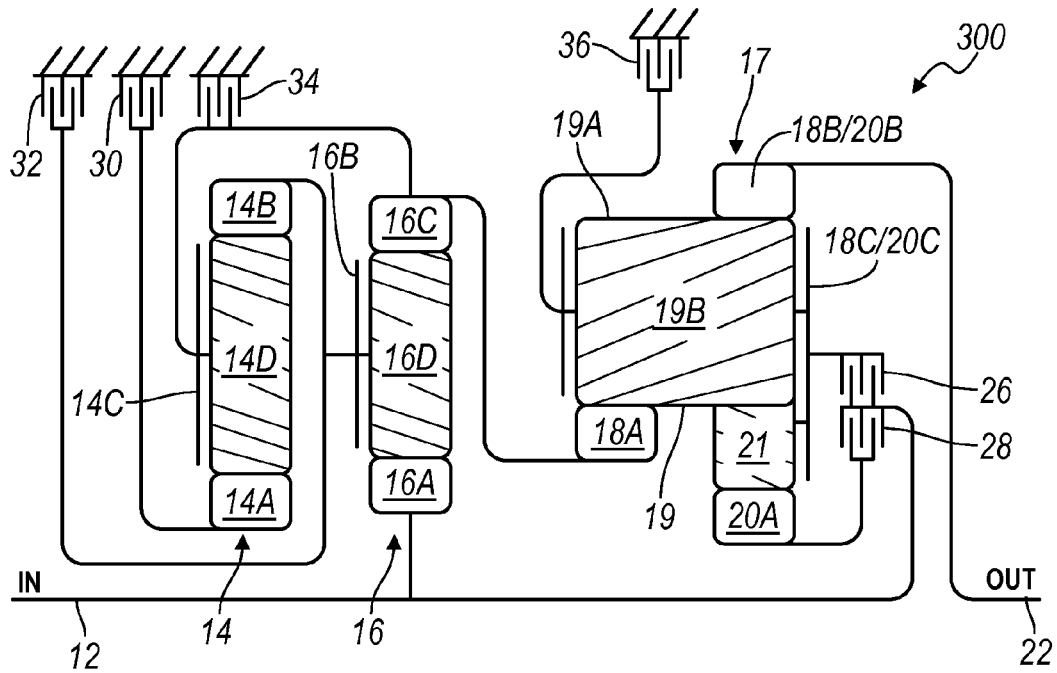
FIG. 8 is a diagrammatic view of an embodiment of a multiple speed transmission according to the present invention.
FIG. 9 is a truth table presenting the state of engagement of the various torque transmitting elements in each of the available forward and reverse speeds or gear ratios of the transmission illustrated in FIGS. 1 and 8.

Turning to FIG. 8, a stick diagram presents a schematic layout of another embodiment of a multiple speed transmission 300 based on the transmission 10 according to the present invention. In FIG. 8, the components of planetary gear sets such as sun gears, ring gears, planet gears and planet gear carriers, clutches, brakes, and couplings are correspondingly presented in the transmission 300. In transmission 300, planetary gear sets 18 and 20 (shown in the lever diagram of FIG. 1) are combined to form a planetary gear set assembly 17. Planetary gear set assembly 17 includes sun gear members 18A and 20A, a ring gear member 18B/20B and a planet gear carrier member 18C/20C that rotatably supports a first set of planet gears 19 (only one of which is shown) and a second set of planet gears 21 (only one of which is shown). The planet gears 19 are long pinion gears that have a first end 19a and a second end 19b. The planet gears 19 are each configured to intermesh with both the sun gear member 18A at the first end 19a and intermesh with the ring gear member 18B/20B and the second set of planet gears 21 at the second end 19b. The second set of planet gears 21 are each configured to intermesh with both the sun gear member 20A and the first set of planet gears 19. The sun gear member 18A is interconnected with the ring gear 16C of the second planetary gear set 16. The ring gear member 18B/20B is connected for common rotation with the output shaft 22. The planet carrier member 18C/20C is connected for common rotation with the brake 36 and clutch 26. Sun gear member 20A is connected for common rotation with clutch 28.

Referring now to FIGS. 8 and 9, the operation of the embodiment of the multiple speed transmission 300 will be described. It will be appreciated that the transmission 300 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34, and fourth brake 36). FIG. 9 is a truth table presenting the various combinations of torque transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 300. An example of the gear ratios that may be obtained using the embodiments of the present invention are also shown in FIG. 9. Of course, other gear ratios are achievable depending on the gear diameter, gear teeth count and gear configuration selected.

Figures 10, 11:
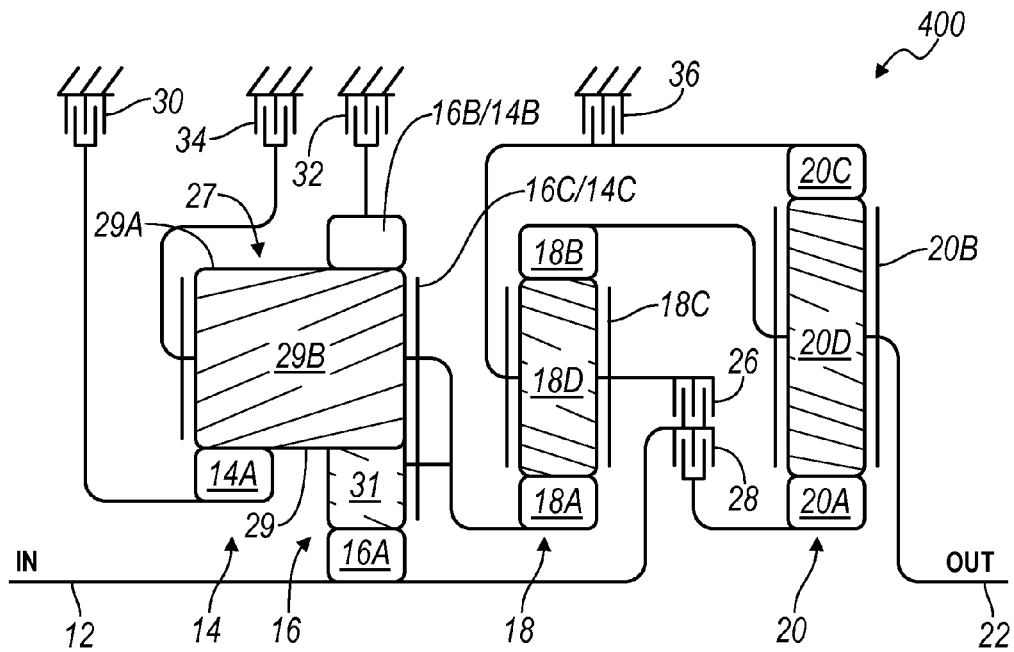
FIG. 10 is a diagrammatic view of an embodiment of a multiple speed transmission according to the present invention.
FIG. 11 is a truth table presenting the state of engagement of the various torque transmitting elements in each of the available forward and reverse speeds or gear ratios of the transmission illustrated in FIGS. 1 and 10.

Turning to FIG. 10, a stick diagram presents a schematic layout of another embodiment of a multiple speed transmission 400 based on the transmission 10 according to the present invention. In FIG. 10, the components of planetary gear sets such as sun gears, ring gears, planet gears and planet gear carriers, clutches, brakes, and couplings are correspondingly presented in the transmission 400. In transmission 400, planetary gear sets 14 and 16 (shown in the lever diagram of FIG. 1) are combined to form a planetary gear set assembly 27. Planetary gear set assembly 27 includes sun gear members 14A and 16A, a ring gear member 14B/16B and a planet gear carrier member 14C/16C that rotatably supports a first set of planet gears 29 (only one of which is shown) and a second set of planet gears 31 (only one of which is shown). The planet gears 29 are long pinion gears that have a first end 29a and a second end 29b. The planet gears 29 are each configured to intermesh with both the sun gear member 14A at the first end 29a and intermesh with the ring gear member 14B/16B and the second set of planet gears 31 at the second end 29b. The second set of planet gears 31 are each configured to intermesh with both the sun gear member 16A and the first set of planet gears 29. The sun gear member 14A is interconnected with brake 30. The ring gear member 14B/16B is interconnected with brake 32. The planet carrier member 14C/16C is connected with the brake 34 and the sun gear 18A of the third planetary gear set 18. Sun gear member 16A is connected for common rotation with clutches 26 and 28 and input shaft 12.

Referring now to FIGS. 10 and 11, the operation of the embodiment of the multiple speed transmission 400 will be described. It will be appreciated that the transmission 400 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34, and fourth brake 36). FIG. 11 is a truth table presenting the various combinations of torque transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 400. An example of the gear ratios that may be obtained using the embodiments of the present invention are also shown in FIG. 11. Of course, other gear ratios are achievable depending on the gear diameter, gear teeth count and gear configuration selected.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission comprising:
   an input member;
   an output member;
   a first and a second planetary gear set each having a first, a second, and a third member, wherein each of the first, second, and third members is included in one of a first rotary member, a second rotary member, a third rotary member, and a fourth rotary member, and wherein two of the members of the first planetary gear set are directly separately connected with two of the members of the second planetary gear set to form the first and the second rotary members and wherein the fourth rotary member is directly connected to the input member;
   a third and a fourth planetary gear set each having a first, a second, and a third member, wherein each of the first, second, and third members is included in one of a fifth rotary member, a sixth rotary member, a seventh rotary member, and an eighth rotary member, and wherein two of the members of the third planetary gear set are directly separately connected with two of the members of the fourth planetary gear set to form the fifth and sixth rotary members and wherein the sixth rotary member is directly connected to the output member;
   an interconnecting member continuously connected to the first rotary member and the seventh rotary member; and
   six torque transmitting devices each selectively engageable to connect at least one of the first, second, third, fourth, fifth, seventh, and eighth rotary members with at least one other of a stationary member and the first, second, third, fourth, fifth, seventh, and eighth rotary members, and
   wherein the torque transmitting devices are selectively engageable in combinations of at least two to establish multiple forward speed ratios and at least one reverse speed ratio between the input member and the output member.

2. The transmission of claim 1 wherein a first of the six torque transmitting devices is selectively engageable to connect the fourth rotary member with the fifth rotary member.

3. The transmission of claim 2 wherein a second of the six torque transmitting devices is selectively engageable to connect the fourth rotary member with the eighth rotary member.

4. The transmission of claim 3 wherein a third of the six torque transmitting devices is selectively engageable to connect the third rotary member with the stationary member.

5. The transmission of claim 4 wherein a fourth of the six torque transmitting devices is selectively engageable to connect the second rotary member with the stationary member.

6. The transmission of claim 5 wherein a fifth of the six torque transmitting devices is selectively engageable to connect the first rotary member, the interconnecting member, and the seventh rotary member with the stationary member.

7. The transmission of claim 6 wherein a sixth of the six torque transmitting devices is selectively engageable to connect the fifth rotary member with the stationary member.

8. The transmission of claim 1 wherein the third member of the first planetary gear set and the third member of the second planetary gear set form the first rotary member, the second member of the first planetary gear set and the second member of the second planetary gear set form the second rotary member, the first member of the first planetary gear set forms the third rotary member, the first member of the second planetary gear set forms the fourth rotary member, the third member of the third planetary gear set and the third member of the fourth planetary gear set form the fifth rotary member, the second member of the third planetary gear set and the second member of the fourth planetary gear set form the sixth rotary member, the first member of the third planetary gear set forms the seventh rotary member, and the first member of the fourth planetary gear set forms the eighth rotary member.

9. The transmission of claim 8 the wherein the first members of the first, second, third, and fourth planetary gear sets are sun gears, the second members of the first, second, and third planetary gear sets and the third member of the fourth planetary gear set are ring gears, and the third members of the first, second, and third planetary gear sets and the second member of the fourth planetary gear set are carrier members.

10. The transmission of claim 8 wherein the first members of the first, second, third, and fourth planetary gear sets are sun gears, the second member of the first planetary gear set, the third member of the second planetary gear set, the second member of the third planetary gear set, and the second member of the fourth planetary gear set are ring gears, and the third member of the first planetary gear set, the second member of the second planetary gear set, the third member of the third planetary gear set, and the third member of the fourth planetary gear set are carrier members.

11. The transmission of claim 8 wherein the first members of the first, second, third, and fourth planetary gear sets are sun gears, the third member of the first planetary gear set, the third member of the second planetary gear set, the second member of the third planetary gear set, and the third member of the fourth planetary gear set are ring gears, and the second member of the first planetary gear set, the second member of the second planetary gear set, the third member of the third planetary gear set, and the second member of the fourth planetary gear set are carrier members.

12. The transmission of claim 8 wherein the first members of the first, second, third, and fourth planetary gear sets are sun gears, the second member of the first planetary gear set and the third member of the second planetary gear set are ring gears, the second members of the third and fourth planetary gear sets are combined to form a single ring gear, the third member of the first planetary gear set and the second member of the second planetary gear set are carrier members, and the third members of the third and fourth planetary gear sets are combined to form a single carrier member.

13. The transmission of claim 8 wherein the first members of the first, second, third, and fourth planetary gear sets are sun gears, the second member of the first planetary gear set and the second member of the second planetary gear set are combined to form a single ring gear, the second member of the third planetary gear set and the third member of the fourth planetary gear set are ring gears, the third member of the first planetary gear set and the third member of the second planetary gear set are combined to form a single carrier member, and the third member of the third planetary gear set and the second member of the fourth planetary gear set are carrier members.

14. A transmission comprising:
an input member;
an output member;
a first and a second planetary gear set each having a first, a second, and a third member, wherein each of the first, second, and third members is included in one of a first rotary member, a second rotary member, a third rotary member, and a fourth rotary member, and wherein two of the members of the first planetary gear set are directly separately connected with two of the members of the second planetary gear set to form the first and the second rotary members and wherein the fourth rotary member is directly connected to the input member;
a third and a fourth planetary gear set each having a first, a second, and a third member, wherein each of the first, second, and third members is included in one of a fifth rotary member, a sixth rotary member, a seventh rotary member, and an eighth rotary member, and wherein two of the members of the third planetary gear set are directly separately connected with two of the members of the fourth planetary gear set to form the fifth and sixth rotary members and wherein the sixth rotary member is directly connected to the output member;
an interconnecting member continuously connected to the first rotary member and the seventh rotary member;
a first torque transmitting device selectively engageable to connect the fourth rotary member with the fifth rotary member;
a second torque transmitting device selectively engageable to connect the fourth rotary member with the eighth rotary member;
a third torque transmitting device selectively engageable to connect the third rotary member with a stationary member;
a fourth torque transmitting device selectively engageable to connect the second rotary member with the stationary member;
a fifth torque transmitting device selectively engageable to connect the first rotary member, the interconnecting member, and the seventh rotary member with the stationary member; and
a sixth torque transmitting device selectively engageable to connect the fifth rotary member with the stationary member, and
wherein the torque transmitting devices are selectively engageable in combinations of at least two to establish at least nine forward speed ratios and at least one reverse speed ratio between the input member and the output member.

15. The transmission of claim 14 wherein the third member of the first planetary gear set and the third member of the second planetary gear set form the first rotary member, the second member of the first planetary gear set and the second member of the second planetary gear set form the second rotary member, the first member of the first planetary gear set forms the third rotary member, the first member of the second planetary gear set forms the fourth rotary member, the third member of the third planetary gear set and the third member of the fourth planetary gear set form the fifth rotary member, the second member of the third planetary gear set and the second member of the fourth planetary gear set form the sixth rotary member, the first member of the third planetary gear set forms the seventh rotary member, and the first member of the fourth planetary gear set forms the eighth rotary member.

16. The transmission of claim 15 the wherein the first members of the first, second, third, and fourth planetary gear sets are sun gears, the second members of the first, second, and third planetary gear sets and the third member of the fourth planetary gear set are ring gears, and the third members of the first, second, and third planetary gear sets and the second member of the fourth planetary gear set are carrier members.

17. The transmission of claim 15 wherein the first members of the first, second, third, and fourth planetary gear sets are sun gears, the second member of the first planetary gear set, the third member of the second planetary gear set, the second member of the third planetary gear set, and the second member of the fourth planetary gear set are ring gears, and the third member of the first planetary gear set, the second member of the second planetary gear set, the third member of the third planetary gear set, and the third member of the fourth planetary gear set are carrier members.

18. The transmission of claim 15 wherein the first members of the first, second, third, and fourth planetary gear sets are sun gears, the third member of the first planetary gear set, the third member of the second planetary gear set, the second member of the third planetary gear set, and the third member of the fourth planetary gear set are ring gears, and the second member of the first planetary gear set, the second member of the second planetary gear set, the third member of the third planetary gear set, and the second member of the fourth planetary gear set are carrier members.

19. The transmission of claim 15 wherein the first members of the first, second, third, and fourth planetary gear sets are sun gears, the second member of the first planetary gear set and the third member of the second planetary gear set are ring gears, the second members of the third and fourth planetary gear sets are combined to form a single ring gear, the third member of the first planetary gear set and the second member of the second planetary gear set are carrier members, and the third members of the third and fourth planetary gear sets are combined to form a single carrier member.

20. The transmission of claim 15 wherein the first members of the first, second, third, and fourth planetary gear sets are sun gears, the second member of the first planetary gear set and the second member of the second planetary gear set are combined to form a single ring gear, the second member of the third planetary gear set and the third member of the fourth planetary gear set are ring gears, the third member of the first planetary gear set and the third member of the second planetary gear set are combined to form a single carrier member, and the third member of the third planetary gear set and the second member of the fourth planetary gear set are carrier members.

* * * * *